US011268822B2

(12) United States Patent
Lee et al.

(10) Patent No.: US 11,268,822 B2
(45) Date of Patent: Mar. 8, 2022

(54) METHOD AND SYSTEM FOR NAVIGATION USING VIDEO CALL

(71) Applicant: LINE Corporation, Tokyo (JP)

(72) Inventors: Dongwon Lee, Seongnam-si (KR); Jungjun Park, Seongnam-si (KR); Jongjin Cho, Seongnam-si (KR); In Won Cho, Seongnam-si (KR)

(73) Assignee: LINE CORPORATION, Tokyo (JP)

(*) Notice: Subject to any disclaimer, the term of this patent is extended or adjusted under 35 U.S.C. 154(b) by 12 days.

(21) Appl. No.: 16/100,694

(22) Filed: Aug. 10, 2018

(65) Prior Publication Data

US 2019/0049265 A1  Feb. 14, 2019

(30) Foreign Application Priority Data

Aug. 14, 2017 (KR) .................. 10-2017-0102953

(51) Int. Cl.
*G01C 21/36* (2006.01)
*G06T 19/00* (2011.01)

(52) U.S. Cl.
CPC ....... *G01C 21/362* (2013.01); *G01C 21/3614* (2013.01); *G01C 21/3647* (2013.01); *G06T 19/006* (2013.01)

(58) Field of Classification Search
CPC .............. G01C 21/362; G01C 21/3614; G01C 21/3647; G06T 19/006
USPC .......................................................... 701/421
See application file for complete search history.

(56) References Cited

U.S. PATENT DOCUMENTS

| 2005/0131638 | A1* | 6/2005 | Sencaj | ............... G01C 21/3676 |
| | | | | 701/533 |
| 2006/0116814 | A1* | 6/2006 | Milbert | .................. G01C 21/20 |
| | | | | 701/416 |
| 2011/0300876 | A1* | 12/2011 | Lee | ..................... G01C 21/362 |
| | | | | 455/456.1 |
| 2012/0278399 | A1* | 11/2012 | Turner | .................... H04L 51/20 |
| | | | | 709/206 |

(Continued)

FOREIGN PATENT DOCUMENTS

| CN | 102281348 A | 12/2011 |
| JP | 2006101013 A | 4/2006 |

(Continued)

OTHER PUBLICATIONS

First Office Action dated Jan. 5, 2022 in Chinese Patent Application No. 201810901022.3.

*Primary Examiner* — Yazan A Soofi
*Assistant Examiner* — Naeem Taslim Alam
(74) *Attorney, Agent, or Firm* — Harness, Dickey & Pierce, P.L.C.

(57) ABSTRACT

Disclosed is a computer-implemented navigation method including transmitting, to a counterpart terminal, current location-based video data that is input to a video call screen of a terminal during a video call; receiving instruction information for a navigation based on the video data from the counterpart terminal that displays the video data on a video call screen of the counterpart terminal; generating navigation information by mapping the instruction information to the video data of the terminal; and providing the navigation information based on location information of the terminal.

20 Claims, 13 Drawing Sheets

(56) References Cited

U.S. PATENT DOCUMENTS

| | | | |
|---|---|---|---|
| 2013/0018574 A1* | 1/2013 | Adler | G01C 21/3492 |
| | | | 701/408 |
| 2013/0157697 A1* | 6/2013 | Kang | H04W 4/029 |
| | | | 455/457 |
| 2016/0250519 A1* | 9/2016 | Watterson | A63B 24/0075 |
| | | | 482/4 |
| 2017/0070856 A1* | 3/2017 | Kim | H04W 40/20 |
| 2017/0169699 A1* | 6/2017 | Will | G08B 25/016 |
| 2017/0322045 A1* | 11/2017 | Breedvelt-Schouten | ........ |
| | | | G06K 9/00791 |
| 2018/0232112 A1* | 8/2018 | Lin | H04M 1/72436 |
| 2018/0365893 A1* | 12/2018 | Mullins | G02B 27/0172 |

FOREIGN PATENT DOCUMENTS

| | | |
|---|---|---|
| KR | 20110044012 A | 4/2011 |
| KR | 10-2012-0008400 A | 1/2012 |
| KR | 10-2016-0086560 A | 7/2016 |
| KR | 20170072480 A | 6/2017 |

\* cited by examiner

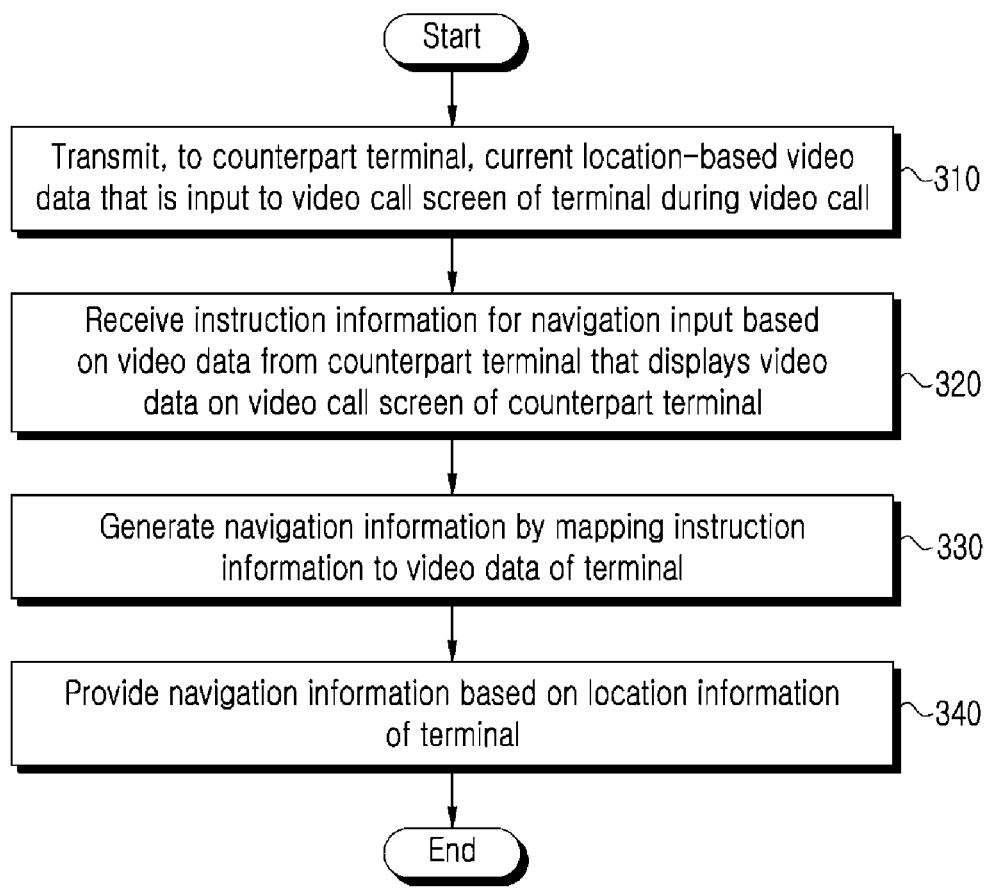

METHOD AND SYSTEM FOR NAVIGATION USING VIDEO CALL

CROSS-REFERENCE TO RELATED APPLICATION(S)

This application claims priority under 35 U.S.C. § 119 to Korean Patent Application No. 10-2017-0102953 filed on Aug. 14, 2017, in the Korean Intellectual Property Office (KIPO), the entire contents of which are incorporated herein by reference.

BACKGROUND

Field

One or more example embodiments relate to a method and system for providing navigation information during a video call.

Description of Related Art

With the development of communication technology, a video call service may be provided using large electronic devices, such as televisions (TVs), as well as mobile communication devices, such as mobile phones. In the video call service, in response to detecting a video call attempt from a calling terminal, a call attempt message may be transmitted to a switch center through a base station or a base station controller. The switch center may acquire routing information to a called terminal through a home location register and may establish a session with the called terminal through a switch center of a called side. Through this process, the calling terminal and the called terminal may perform a video call while viewing a face of a counter party through transmission and reception of audio and video.

However, a video call may not allow a user to view a video that a counterpart user is viewing and to verify a video that the counterpart user is transmitting. Accordingly, if a query for a route is present during the video call, the route may be explained only by voice.

SUMMARY

One or more example embodiments provide a method and system that may provide augmented reality (AR)-based navigation information during a video call between terminals.

One or more example embodiments also provide a method and system that may provide navigation information generated based on location information of a terminal during a video call between terminals.

According to an aspect of at least one example embodiment, there is provided a computer-implemented navigation method including transmitting, to a counterpart terminal, current location-based video data that is input to a video call screen of a terminal during a video call; receiving instruction information for a navigation based on the video data from the counterpart terminal that displays the video data on a video call screen of the counterpart terminal; generating navigation information by mapping the instruction information to the video data of the terminal; and providing the navigation information based on location information of the terminal.

The providing of the navigation information may include providing augmented reality (AR)-based navigation information generated by mapping the instruction information to the video data of the terminal, based on the location information of the terminal.

The generating of the navigation information may include generating the navigation information by mapping a layer including the instruction information to the video data based on a location at which the instruction information is input.

The receiving of the instruction information may include receiving, from the counterpart terminal, instruction information that is input through a user interface for inputting the instruction information in response to the user interface being provided to the counterpart terminal.

The receiving of the instruction information may include receiving, from the counterpart terminal, instruction information associated with a specific event input to the video data.

The providing of the navigation information may include providing guidance information associated with the navigation information based on the location information of the terminal.

The providing of the navigation information may include consecutively updating the navigation information based on changed location information of the terminal in response to the location information of the terminal being changed.

The providing of the navigation information may include playing content including a destination route of the terminal as the navigation information in response to the content being uploaded from the counterpart terminal.

The providing of the navigation information may include generating information associated with a deviation of the terminal in response to detecting an occurrence of the deviation of the terminal based on the navigation information.

The providing of the navigation information may include transmitting and receiving a message between the terminal and the counterpart terminal.

The providing of the navigation information may include displaying a travel route through which the terminal is moving based on the location information of the terminal.

The transmitting of the current location-based video data may include transmitting, to the counterpart terminal, the current location-based video data that is input to the video call screen of the terminal, according to a camera mode that operates during the video call.

According to an aspect of at least one example embodiment, there is provided a non-transitory computer-readable recording medium storing instructions that, when executed by a processor, cause the processor to perform a navigation method including transmitting, to a counterpart terminal, current location-based video data that is input to a video call screen of a terminal during a video call; receiving instruction information for a navigation based on the video data from the counterpart terminal that displays the video data on a video call screen of the counterpart terminal; generating navigation information by mapping the instruction information to the video data of the terminal; and providing the navigation information based on location information of the terminal.

According to an aspect of at least one example embodiment, there is provided a navigation server including a memory configured to store instructions; and a processor, configured to execute the instructions to determine current location information of a terminal during a video call; acquire additional information associated with instruction information for a navigation that is input based on video data of a terminal from the counterpart terminal in response to the video data of the terminal being displayed on a video call screen of the counterpart terminal; and provide the additional information associated with the instruction information to the terminal to be mapped to the video data.

The processor may be configured to generate AR-based navigation information by mapping the additional information associated with the instruction information to the video data.

The processor may further be configured to transfer map information including the current location information of the terminal to the video call screen of the counterpart terminal.

The processor may be configured to generate guidance information based on the current location information of the terminal and the instruction information.

The processor may be configured to set a deviation range for detecting a deviation of the terminal, to determine whether the terminal is deviated based on the deviation range, and to generate an alert message.

The processor may be configured to generate a layer that includes additional information associated with the instruction information and to transmit the layer to the terminal.

The processor may be configured to display, on the video call screen of the counterpart terminal, a travel route according to location information of the terminal based on the navigation information that is displayed on the video call screen of the terminal.

According to some example embodiments, a user may conveniently verify a travel route since navigation information is displayed on a video call screen of a terminal during a video call between terminals.

Also, according to some example embodiments, a user may easily and accurately reach a destination since navigation information according to location of a terminal is displayed on a video call screen of the terminal during a video call between terminals.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 3 is a flowchart illustrating an example of a navigation method of a terminal according to at least one example embodiment;

Figure 1:
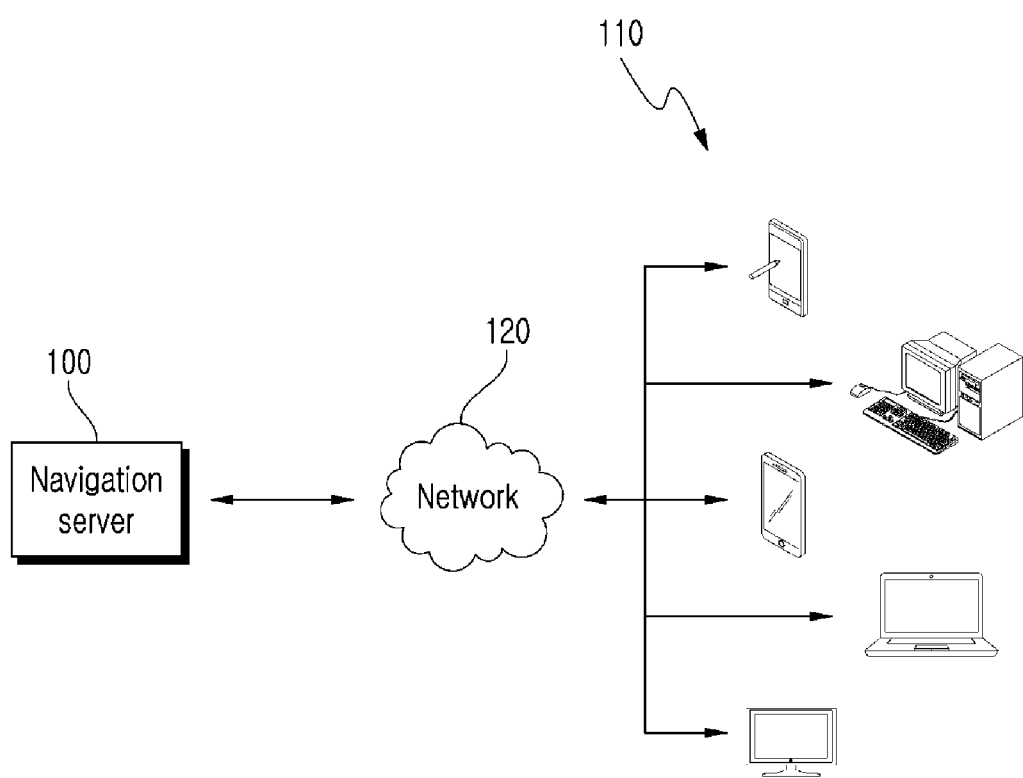
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network.

The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment.

Referring to FIG. 1, the network environment includes a terminal 110, a server 100, and/or a network 120. FIG. 1 is provided as an example only and thus, a number of terminals and/or a number of servers are not limited thereto.

The terminal 110 may be a fixed terminal or a mobile terminal that is configured as a computer device. For example, the terminal 110 may be a smartphone, a mobile phone, a navigation, a computer, a laptop computer, a digital broadcasting terminal, a personal digital assistance (PDA), a portable multimedia player (PMP), tablet PC, a wearable device, a head mounted display (HMD), and the like. For example, the terminal 110 may communicate with other terminals and/or the server 100 over the network 120 in a wired communication manner or in a wireless communication manner.

The communication scheme is not particularly limited and may include a communication method that uses a near field communication between devices as well as a communication method using a communication network, for example, a mobile communication network, the wireless Internet, a broadcasting network, etc., which may be included in the network 120. For example, the network 120 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 120 may include at least one of network topologies that include a bus network, a star network, a ring network, a mesh network, a star-bus network, a tree or hierarchical network, and the like. However, it is only an example and the example embodiments are not limited thereto.

The server 100 may be configured as a computer apparatus or a plurality of computer apparatuses that provides instructions, codes, files, contents, services, and the like through communication with the plurality of terminal 110 over the network 120. For example, the server 100 may provide a file for installing an application to the terminal 110 connected through the network 120. In this case, the terminal 110 may install the application using the file provided from the server 100. Also, the terminal 110 may access the server 100 under control of at least one program, for example, browser or the installed application, or an operating system (OS) included in the terminal 110, and may use a service or content provided from the server 100. For example, when the terminal 110 transmits a service request message to the server 100 through the network 120 under control of the application, the server 100 may transmit a code corresponding to the service request message to the terminal 110 and the terminal 110 may provide content to a user by configuring and displaying a screen according to the code under control of the application.

Hereinafter, technology that enables at least one terminal 110 to provide navigation information while a video call is ongoing is described. Also, the server 100 used herein may refer to a navigation server and the navigation server 100 may be interchangeably used.

Figure 2A:
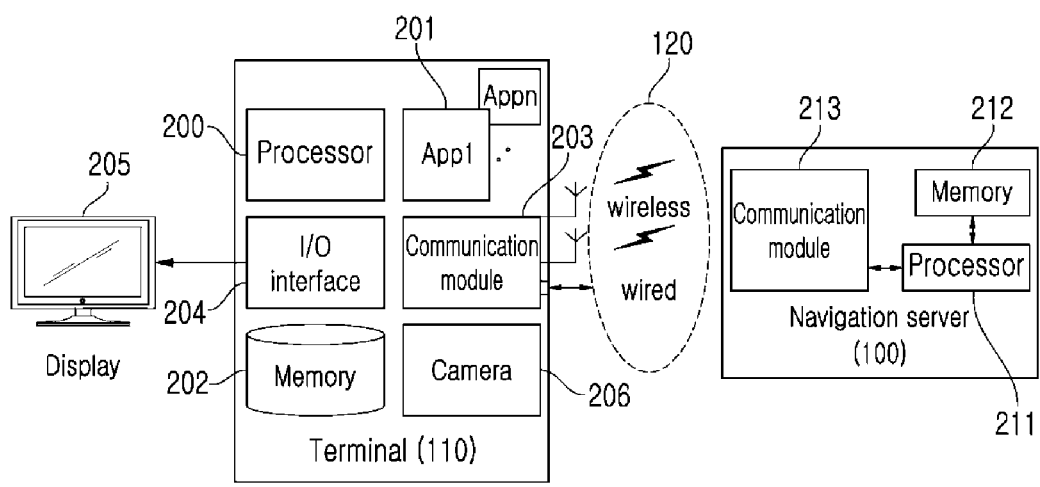
FIG. 2A is a block diagram illustrating an example of a configuration of a terminal and a server according to at least one example embodiment.

FIG. 2A is a block diagram illustrating an example of a configuration of a terminal and a server according to at least one example embodiment.

Although FIG. 2A illustrates a configuration of a single terminal and a signal server, for example, a single navigation server, the same or similar components may be applied to other terminals or other servers includable in the network environment of FIG. 1.

Referring to FIG. 2A, the terminal 110 may include, for example, a processor 200, at least one application (app 1, . . . , appn) 201, a memory 202, a communication module 203, an input/output (I/O) interface 204, and/or a camera 206.

The navigation server 100 may include a processor 211, a memory 212, and/or a communication module 213. The memory 202, 212 may include a permanent mass storage device, such as random access memory (RAM), read only memory (ROM), a disk drive, a solid state drive, a flash memory, etc., as a non-transitory computer-readable storage medium. Also, an operating system (OS) or at least one program code, for example, a code for the application or a browser installed and executed on the terminal 110, etc., may be stored in the memory 202, 212. Such software components may be loaded from another non-transitory computer-readable storage medium separate from the memory 202, 212 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 202, 212 through the communication module 203, 213, instead of, or in addition to, the non-transitory computer-readable storage medium. For example, at least one program may be loaded to the memory 202, 212 based on a program, for example, the application, installed by files provided over the network 120 from developers or a file distribution system, for example, the navigation server 100, which provides an installation file of the application.

The processor 200, 211 may be configured to process computer-readable instructions of a computer program by performing basic arithmetic operations, logic operations, and I/O operations. The computer-readable instructions may be provided from the memory 202, 212 and/or the communication module 203, 213 to the processor 200, 211. For example, the processor 200, 211 may be configured to execute received instructions in response to the program code stored in the storage device, such as the memory 202, 212.

The communication module 203, 213 may provide a function for communication between the terminal 110 and the navigation server 100 over the network 120, and may provide a function for communication between the terminal 110 and/or the navigation server 100 and another terminal and/or another server. For example, the processor 200 of the terminal 110 may transfer a request created based on a program code stored in the storage device such as the memory 202, to the navigation server 100 over the network 120 under control of the communication module 203. Inversely, a control signal, an instruction, content, a file, etc., provided under control of the processor 211 of the navigation server 100 may be received at the terminal 110 through the communication module 203 of the terminal 110 by going through the communication module 213 and the network 120. For example, a control signal, an instruction, content, a file, etc., of the navigation server 100 received through the communication module 203 may be transferred to the processor 200 or the memory 202, and content, a file, etc., may be stored in a storage medium further includable in the terminal 110.

The I/O interface 204 may be a device used for interface with an I/O device. For example, an input device may include a keyboard, a mouse, a microphone, a camera, etc., and an output device may include a device, such as a display for displaying a communication session of the application. As another example, the I/O interface 204 may be a device for interface with an apparatus in which an input function and an output function are integrated into a single function, such as a touchscreen. In detail, when processing instructions of the computer program loaded to the memory 202, the processor 200 of the terminal 110 may display a service screen configured using data provided from the navigation server 100 or the other terminal or may display content on a display 205 through the I/O interface 204.

According to other example embodiments, the terminal 110 and the navigation server 100 may include a greater or lesser number of components than a number of components shown in FIG. 2A. However, there is no need to clearly illustrate many components according to the related art. For example, the terminal 110 may include at least a portion of the I/O device, or may further include other components, for example, a transceiver, a global positioning system (GPS) module, the camera 206, a variety of sensors, a database, and the like. In detail, if the terminal 110 is a smartphone, the terminal 110 may be configured to further include a variety of components, for example, an accelerometer sensor, a gyro sensor, a camera, various physical buttons, a button using a touch panel, an I/O port, a vibrator for vibration, etc., which are generally included in the smartphone.

Figure 2B:
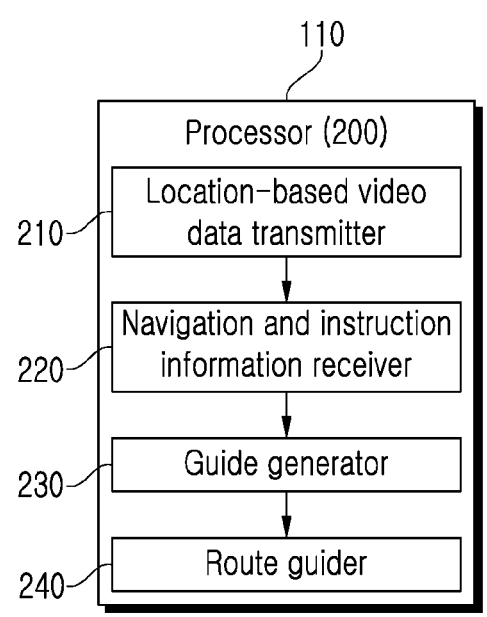
FIG. 2B is a block diagram illustrating an example of components includable in a processor of a terminal according to at least one example embodiment.

FIG. 2B is a block diagram illustrating an example of components includable in a processor of a terminal according to at least one example embodiment, and FIG. 3 is a flowchart illustrating an example of a navigation method of a terminal according to at least one example embodiment.

Referring to FIG. 2B, the processor 200 of the terminal 110 may include a location-based video data transmitter 210, a navigation and instruction information receiver 220, a guide generator 230, and/or a route guider 240. The components of the processor 200 may be representations of different functions performed by the processor 200 in response to a control instruction provided from a program code stored in the terminal 110. The processor 200 and the components of the processor 200 may control the terminal 110 to perform operations 310 through 340 included a navigation method of FIG. 3. Here, the processor 200 and the components of the processor 200 may be configured to execute an instruction according to a code of at least one program and a code of an OS included in a memory.

The processor 200 may load, to the memory, a program code stored in a file of a program for the navigation method. For example, in response to executing the program on the terminal 110, the processor 200 may control the terminal 110 to load the program code from the file of the program to the memory under control of the OS. Here, the processor 200 and the location-based video data transmitter 210, the navigation and instruction information receiver 220, the guide generator 230, and the route guider 240 may be different functional representations of the processor 200 to perform operations 310 through 340 by executing an instruction of a portion corresponding to the program code loaded to the memory.

Referring to FIG. 3, in operation 310, the location-based video data transmitter 210 may transmit, to a counterpart terminal, current location-based video data that is input to a video call screen of the terminal 110 during a video call.

In operation 320, the navigation and instruction information receiver 220 may receive instruction information for a navigation input based on the video data from the counterpart terminal that displays the video data on a video call screen of the counterpart terminal. For example, a user interface for inputting instruction information may be provided to the counterpart terminal. The instruction information input through the user interface may be received from the counterpart terminal. Alternatively, the instruction information may be received from the counterpart terminal through an event input to the video data that is displayed on the video call screen of the counterpart terminal.

In operation 330, the guide generator 230 may generate navigation information by mapping the instruction information to the video data of the terminal 110. The guide generator 230 may generate the navigation information by mapping a layer including the instruction information to the video data based on a location at which the instruction information is input. Here, the layer including the instruction information may include location information of the instruction information that is input to the video data. The guide generator 230 may generate augmented reality (AR)-based navigation information by mapping the layer including the instruction information to the video data of the terminal 110. Also, if additional information associated with the instruction information is transferred from a server, for example, the navigation server 100, the guide generator 230 may generate the navigation information by mapping the layer including the additional information to the video data that is displayed on the terminal 110.

In operation 340, the route guider 340 may provide the navigation information based on location information of the terminal 110. Here, the route guider 340 may update the navigation information based on changed location information of the terminal 110 in response to the location information of the terminal 110 being changed and may provide the updated navigation information. The route guider 340 may provide guidance information associated with the navigation information according to the location information of the terminal 110. For example, the route guider 340 notify a direction in which the terminal 110 is to move based on navigation information associated with a current location of the terminal 110. The route guider 340 may display the guidance information as text data on a video call screen of the terminal 110 and simultaneously provide the guidance information using voice data. Also, the route guider 340 may display a travel route through which the terminal 110 is moving based on the location information of the terminal 110 on the video call screen of the terminal 110.

Figure 4:
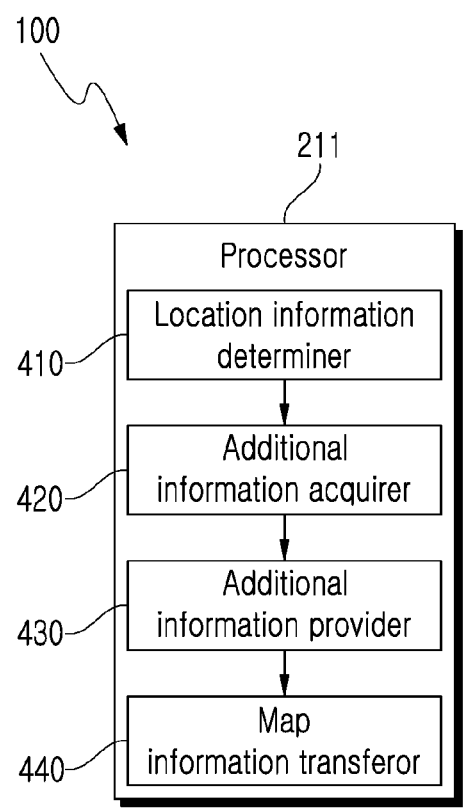
FIG. 4 is a block diagram illustrating an example of components includable in a processor of a server according to at least one example embodiment.

FIG. 4 is a block diagram illustrating an example of components includable in a processor of a server, for example, a navigation server, according to at least one example embodiment.

Referring to FIG. 4, the processor 211 of the navigation server 100 may include a location information determiner 410, an additional information acquirer 420, an additional information provider 430, and a map information transferor 440. The components of the processor 211 may be representations of different functions performed by the processor 211 in response to a control instruction provided from a program code stored in the navigation server 100. The processor 211 and the components of the processor 211 may be configured to execute an instruction according to a code of at least one program and a code of an OS included in a memory.

The processor 211 may load, to the memory, a program code stored in a file of a program for the navigation method. For example, in response to executing the program on the navigation server 100, the processor 211 may control the navigation server 100 to load the program code from the file of the program to the memory under control of the OS. Here, the processor 211 and the location information determiner 410, the additional information acquirer 420, the additional information provider 430, and the map information transferor 440 included in the processor 211 may be different functional representations of the processor 211 that execute an instruction of a portion corresponding to the program code loaded to the memory.

The location information determiner 410 may determine current location information of the terminal 110 during a video call. For example, the location information determiner 410 may determine current location information of the terminal 110 based on video data that is input on a video call screen of the terminal 110. In detail, the location information determiner 410 may determine location information of the terminal 110 based on metadata included in video data acquired from a camera of the terminal 110. The video data may include the metadata, for example, size information of a video, information associated with a date on which the video is captured, and information associated with a location at which the video is captured. As another example, the location information determiner 410 may determine whether the terminal 110 is indoors or outdoors based on building information and roads information included in the video data that is acquired from the camera of the terminal 110. The location information determiner 410 may estimate current location information of the terminal 110 from text information or image information included in the building information, for example, a company name and a telephone number, and the roads information, for example, a road name address, included in the video data. As another example, the location information determiner 410 may estimate the current location information of the terminal 110 based on GPS information of the terminal 110.

The additional information acquirer 420 may acquire additional information associated with instruction information for a navigation that is input based on video data of the terminal 110 from a counterpart terminal in response to the video data of the terminal 110 being displayed on a video call screen of the counterpart terminal. Here, the additional information may be information that is additionally providable in association with the instruction information. For example, the additional information acquirer 420 may generate guidance information based on the current location information of the terminal 110 and the instruction information. Here, the guidance information may refer to providing a guide message based on current location information of the terminal 110, such as in a navigation device. Also, the additional information acquirer 420 may set a deviation range for detecting a deviation of the terminal 110 based on the navigation information provided from the terminal 110, may determine whether the terminal 110 is deviated based on the deviation range, and may generate an alert message. For example, if the terminal 110 is deviated from a route by 5 meters or more based on navigation information provided from the terminal 110 while the terminal 110 is moving along the route, the additional information acquirer 420 may determine that the terminal 110 is deviated from the route and may generate the alert message.

The additional information provider 430 may provide the additional information associated with the instruction information to the terminal 110 to be mapped to the video data. The additional information provider 430 may provide the additional information associated with the instruction information to the terminal 110 to be mapped to the video data that is currently being displayed on the terminal 110. For example, the additional information provider 430 may generate a layer that includes additional information associated with the instruction information and may transmit the layer to the terminal 110. The layer including the additional information provided from the additional information provider 430 to the terminal 110 may be mapped to the video data that is currently being displayed on the terminal 110 and the navigation information may be generated. Here, the navigation information may be generated as AR-based navigation information.

The map information transferor 440 may transfer map information including the current location information of the terminal 110 to the video call screen of the counterpart terminal. For example, the map information transferor 440 may transfer map information including current location information of the terminal 110 from a map server to the video call screen of the counterpart terminal and may display the map information on the video call screen of the counterpart terminal through a map application programming interface (API). The map information transferor 440 may display, on the video call screen of the counterpart terminal, a travel route, for example, a route through which the terminal 110 is moving, according to location information of the terminal 110 based on the navigation information that is displayed on the video call screen of the terminal 110. The counterpart terminal may verify the travel route of the terminal 110 that is displayed on the video call screen of the counterpart terminal.

Figure 5:
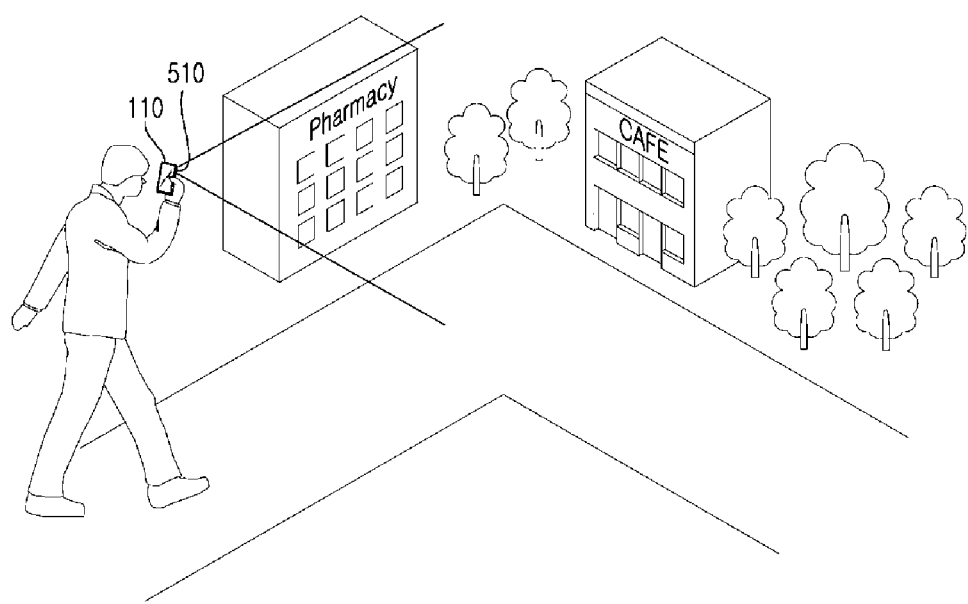
FIG. 5 illustrates an example of inputting video data on a video call screen of a terminal according to at least one example embodiment.

FIG. 5 illustrates an example of inputting video data on a video call screen of a terminal according to at least one example embodiment.

A video call between at least one terminal and at least one counterpart terminal may be ongoing. Here, the video call may be performed between, generally, a single terminal and another single terminal. Also, the video call may be performed between a plurality of terminals. For example, if the video call is performed through a messenger application, the video call may be supported between a plurality of terminals present in a chatroom of the messenger application. Here, each of the terminals may execute a front camera for the video call. A face of a user may be displayed on each corresponding terminal and users may perform a face-to-face video call.

Referring to FIG. 5, the terminal 110 may request a counterpart terminal about a route during a video call between the terminal 110 and the counterpart terminal. The terminal 110 may request the counterpart terminal about a location that is known by the counterpart terminal. For example, the terminal 110 may be moving to a location at which the counterpart terminal is present or to a location at which the counterpart terminal has been. A front camera mode for executing a front camera of the terminal 110 may be switched to a rear camera mode for executing a rear camera 510 of the terminal 110. That is, the rear camera 510 may be executed on the terminal 110.

In response to executing the rear camera 510 on the terminal 110, video data may be recorded based on a current location of the terminal 110. During the video call, the terminal 110 may acquire the current location-based video data that is input to a video call screen of the terminal 110. For example, the video data that is input through the rear camera 510 of the terminal 110 may include a street view that includes roads and buildings present around the terminal 110. The current location-based video data that is input to the video call screen of the terminal 110 may be transmitted to the counterpart terminal.

The terminal 110 may include a terminal that requests another terminal for a route and the other terminal that provides a navigation for the requested route. Here, each terminal may request a route or may provide a navigation depending on a situation. Hereinafter, a description is made based on an example in which the other terminal providing the navigation about the requested route is referred to as a counterpart terminal 110a and the terminal requesting the other terminal for the route is referred to as a terminal 110b.

Figure 6:
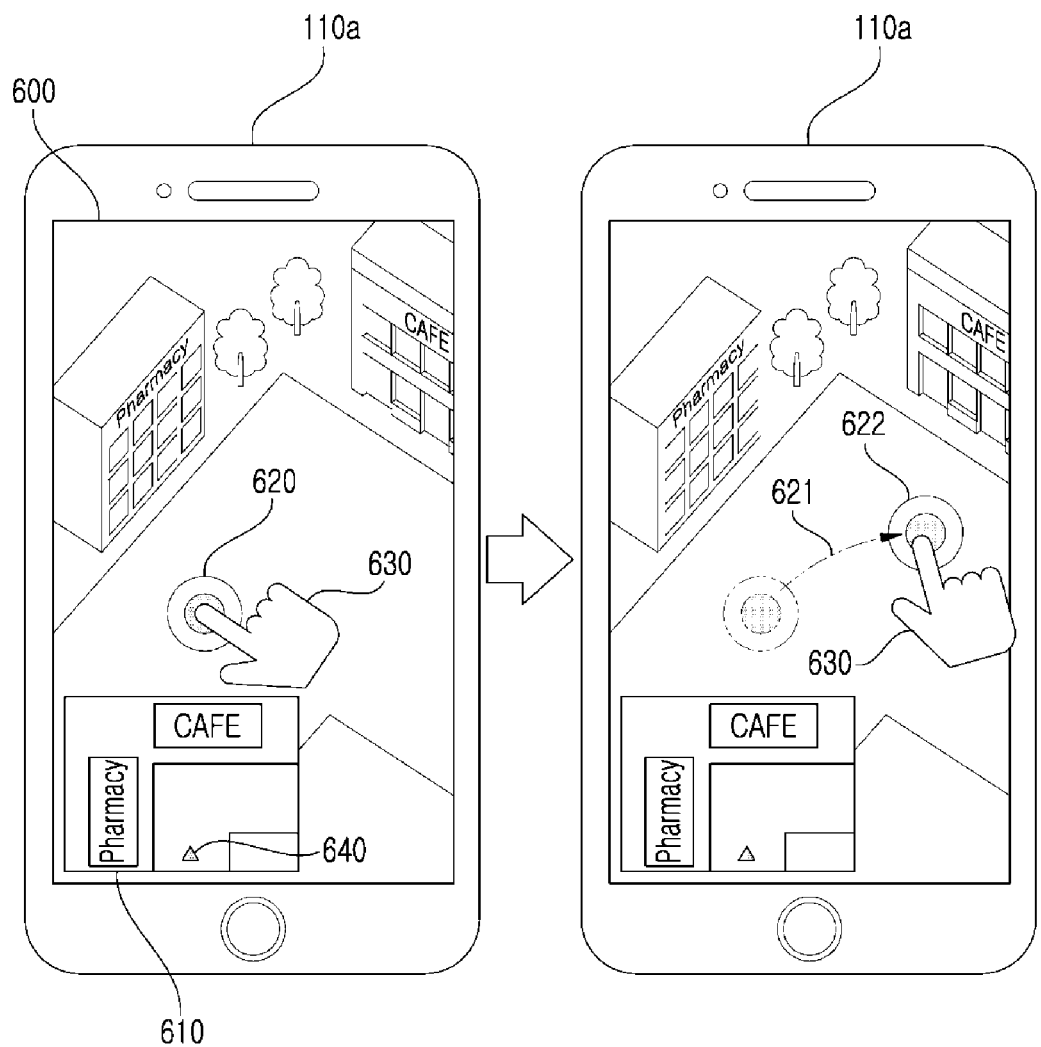
FIGS. 6 and 7 illustrate examples of inputting instruction information at a terminal according to at least one example embodiment.
Figure 7:
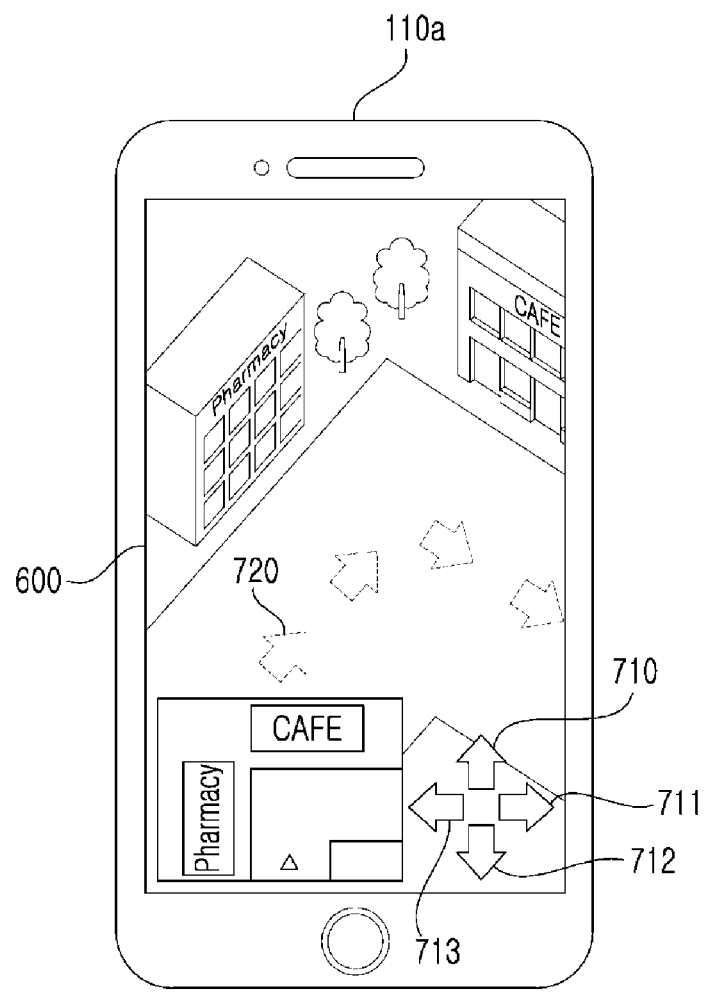

FIGS. 6 and 7 illustrate examples of inputting instruction information at a terminal according to at least one example embodiment.

Hereinafter, a method of inputting instruction information at the counterpart terminal 110a that displays video data on a video call screen 600 will be described with reference to FIGS. 6 and 7.

Current location-based video data input to a video call screen of a terminal may be transmitted to the counterpart terminal 110a. The video data may be displayed on the video call screen 600 of the counterpart terminal 110a. The video data and map information 610 may be displayed on the video call screen 600 of the counterpart terminal 110a. Here, the map information 610 including current location information 640 of the terminal may be provided from a server.

A user 630 may input instruction information to the video data that is displayed on the video call screen 600 of the counterpart terminal 110a. Here, a screen of the counterpart terminal 110a may be configured as a touchscreen that enables a touch input. The counterpart terminal 110a may recognize the instruction information that is input from the user 630.

Referring to FIG. 6, the user 630 may input the instruction information through a specific event, for example, a touch-and-drag event, based on the video data that is displayed on the video call screen 600 of the counterpart terminal 110a. Here, the specific event may be set to identify an instruction input from the user 630 as the instruction information. For example, the specific event may include the touch-and-drag event. Also, the specific event that is identified as the instruction information may be changed based on settings of the user 630. For example, the user 630 may input instruction information that includes direction information through the touch-and-drag event.

For example, the user 630 may input instruction information to video data based on the map information 610 including the current location information 640 of the terminal, displayed on the video call screen 600 of the counterpart terminal 110a. The user 630 may input a touch for inputting the instruction information on the video call screen 600 of the counterpart terminal 110a. In detail, the user 630 may input the instruction information by dragging the touch from a start point 620 at which the touch is input to an end point 622 at which the touch ends as indicated by dotted lines 621.

As another example, referring to FIG. 7, user interfaces 710, 711, 712, and 713 for inputting instruction information may be displayed on the video call screen 600 of the counterpart terminal 110a. A user may select a desired user interface from among the user interfaces 710, 711, 712, and 713 with respect to video data that is displayed on the video call screen 600 of the counterpart terminal 110a based on map information including location information of a terminal, displayed on the video call screen 600 of the counterpart terminal 110a. Here, the user interfaces 710, 711, 712, and 713 may include direction information associated with up, down, left, and right. As indicated by an indicator 720 with an arrowhead, a user interface selected by the user may be marked on the video data displayed on the video call screen 600 of the counterpart terminal 110a. The user may modify the user interface marked on the video data displayed on the video call screen 600 of the counterpart terminal 110a.

As described above, the terminal may receive the instruction information that is input from the user to the video call screen 600 of the counterpart terminal 110a and may generate navigation information based on current location information of the terminal. That is, the user may not accurately select current location information displayed on the map information of the counterpart terminal 110a on the video call screen 600 of the counterpart terminal 110a. Accordingly, the terminal may generate navigation information based on the current location information of the terminal input to the video data displayed on the video call screen 600 of the counterpart terminal 110a.

FIGS. 8 through 11 illustrate examples of providing navigation information at a terminal according to at least one example embodiment.

Figure 8:
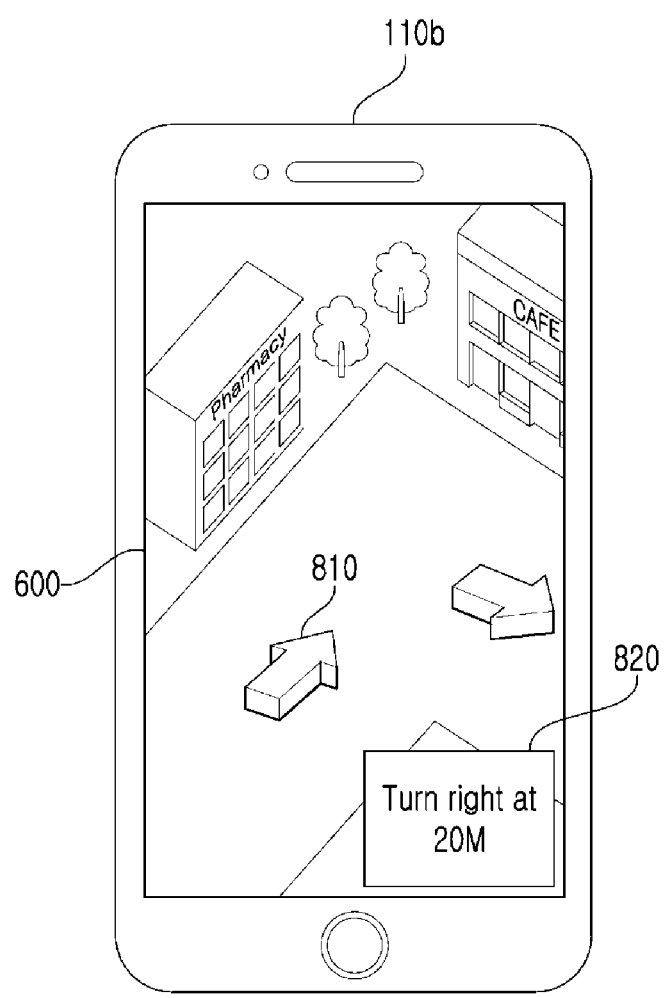
FIGS. 8 through 11 illustrate examples of providing navigation information at a terminal according to at least one example embodiment.

Referring to FIG. 8, the terminal 110b may generate navigation information 810 by mapping instruction information input from a counterpart terminal to video data of the terminal 110b. The terminal 110b may generate the navigation information 810 by mapping a layer including the instruction information to the video data based on a location at which the instruction information is input. In addition, a server may generate guidance information 820 based on instruction information input from the counterpart terminal and location information of the terminal 110b. The terminal 110b may generate the navigation information 810 by receiving the guidance information 820 from the server and by mapping the guidance information 820 to the video data.

The terminal 110b may provide the navigation information 810 based on the location information of the terminal 110b. Here, the terminal 110b may provide the navigation information 810 based on augmented reality. Also, the terminal 110*b* may provide the navigation information 810 based on virtual reality.

The navigation information 810 and the guidance information 820 may be displayed on the video call screen 600 of the terminal 110*b*. If the terminal 110*b* is moving based on the navigation information 810, the guidance information 820 may be provided based on location information of the terminal 110*b*. For example, as the terminal 110*b* moves based on instruction information such as the navigation information 810, the guidance information 820 saying "Please turn right at 20M" may be provided based on current location information of the terminal 110*b*. Here, the guidance information 820 may be displayed as a message on the video call screen 600 of the terminal 110*b* and may be output as a voice message.

A terminal according to example embodiments may provide a route based on navigation information and may also provide guidance information so that a user may further easily find the route.

In the meantime, since the video call is ongoing between the terminal 110*b* and the counterpart terminal, video data including a travel route through which the terminal 110*b* is moving may be displayed on a video call screen of the counterpart terminal. The counterpart terminal may input an instruction through the video call in response to the video data and the travel route being displayed on the video call screen of the counterpart terminal. For example, if the counterpart terminal inputs a message "You can find it immediately if you turn right" with respect to the travel route through which the terminal 110*b* is moving, the input message may be transferred to the terminal 110*b*.

Figure 9:
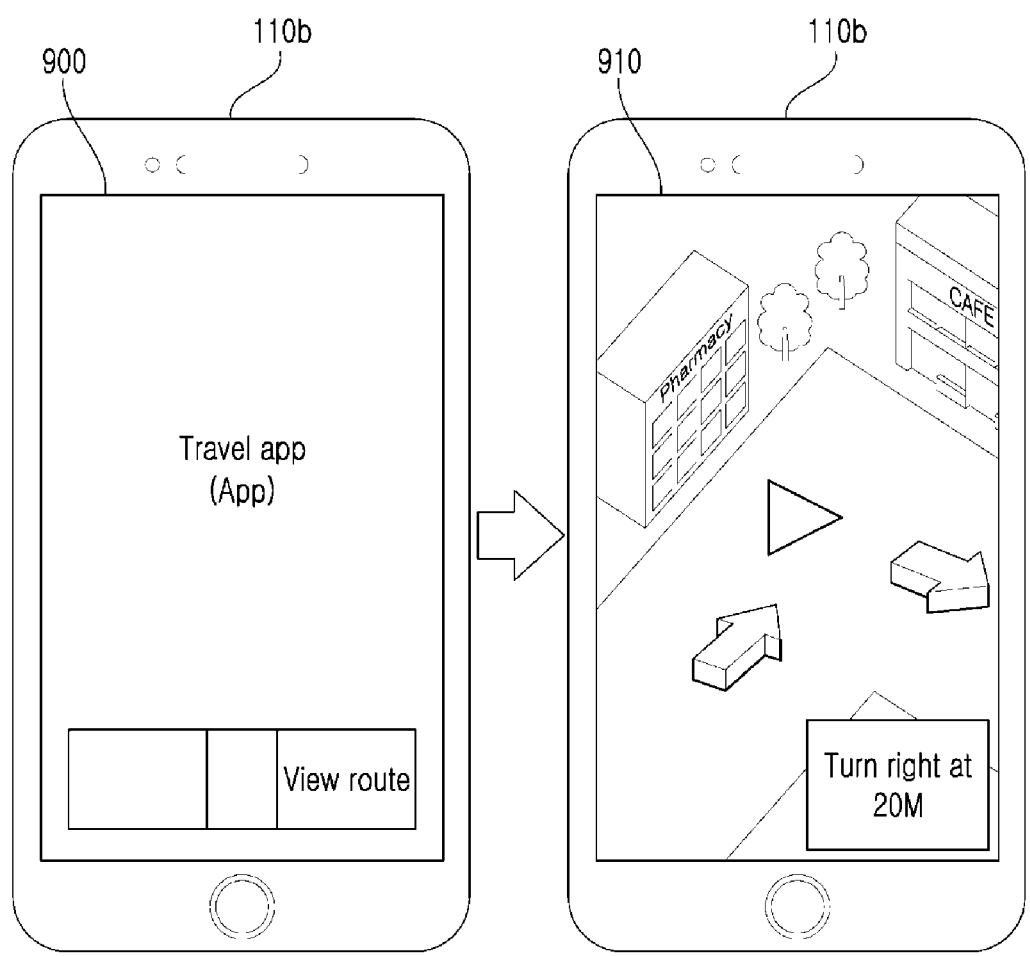

Referring to FIG. 9, content 910 including a destination route of the terminal 110*b* may be updated and played on the terminal 110*b* and thereby provided as navigation information. For example, the terminal 110*b* may generate the navigation information based on a plurality of pieces of route information registered to an app 900, for example, a travel app. For example, if a user initially arrives at a new travel area, the user may not readily reach a desired destination. Accordingly, navigation information that enables the user to reach the destination may be provided through the app 900. In detail, route information may be input from other users having visited the new travel area and in response thereto, a navigation server may collect the input route information and may generate the content 910 including the navigation information. The terminal 110*b* may provide the navigation information by playing the content 910 including AR-based navigation information according to location information of the terminal 110*b*. Here, since the content 910 corresponding to location information of the user is played, the user may further readily find a way to the destination.

Alternatively, the terminal 110*b* may provide the navigation information by receiving the content 910 that includes route information input from other users having visited the new travel area or a user present in the destination, and by playing the content 910 according to the location information of the terminal 110*b*.

Figure 10:
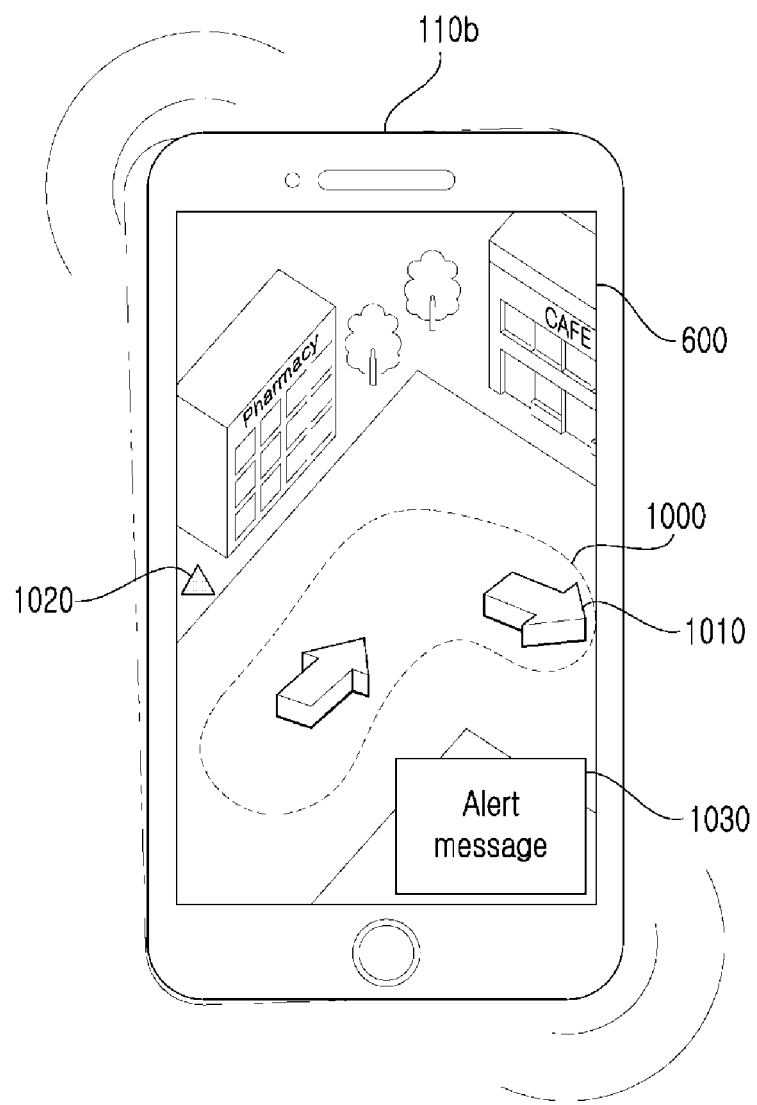

Referring to FIG. 10, current location information 1020 of the terminal 110*b* may be displayed on the video call screen 600 of the terminal 110*b*. The terminal 110*b* may determine whether the current location information 1020 of the terminal 110*b* is deviated from a deviation range 1000 set in navigation information 1010. If the terminal 110*b* is outside, that is, deviated from the deviation range 1000, the terminal 110*b* may receive an alert message 1030 from a navigation server. The alert message 1030 may be displayed on the video call screen 600 of the terminal 110*b* and may trigger an alert, for example, vibration in the terminal 110*b*. For example, the navigation server may set the deviation range 1000 for detecting a deviation of the terminal 110*b* based on instruction information input from a counterpart terminal. The navigation server may determine whether the terminal 110*b* is deviated from the set deviation range 1000 and may generate the alert message 1030. The navigation server may transfer the alert message 1030 to the terminal 110*b*. As another example, the current location information 1020 of the terminal 110*b* may be provided to the terminal 110*b* and the counterpart terminal and a travel route according to the navigation information of the terminal 110*b* may be displayed on the video call screen 600 of the terminal 110*b* and a video call screen of the counterpart terminal. If the terminal 110*b* is deviated from the deviation range 1000, the navigation server may transfer the alert message 1030 to the counterpart terminal. The counterpart terminal may alert the terminal 110*b* based on the current location information 1020 of the terminal 110*b* that is displayed on the video call screen of the counterpart terminal.

Figure 11:
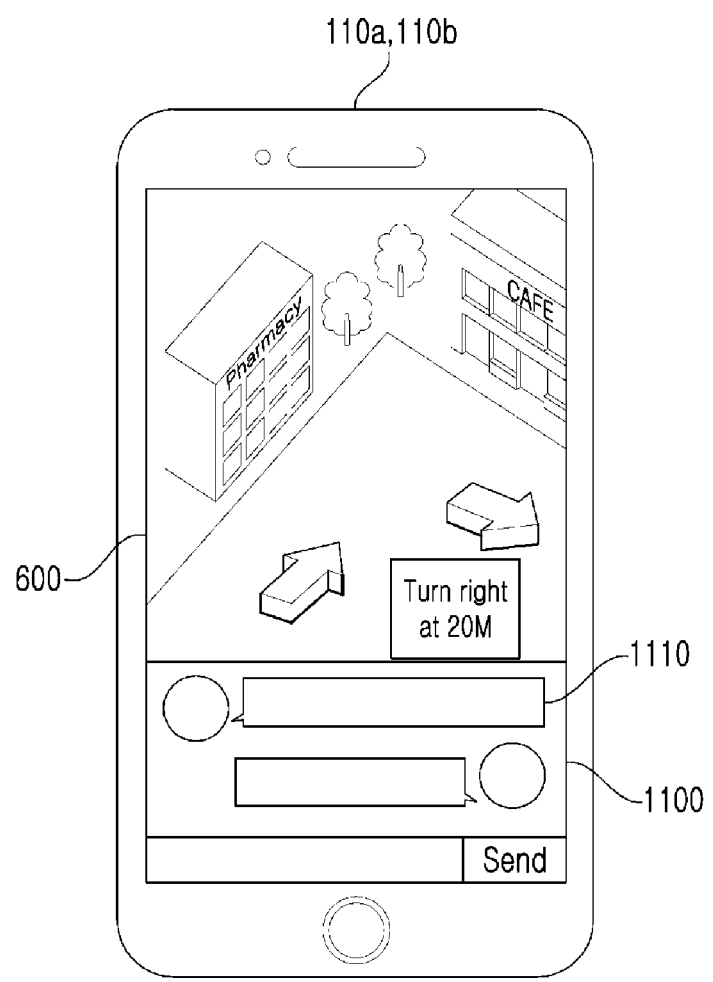

Referring to FIG. 11, a navigation server may simultaneously display navigation information and a messaging environment 1100 on the video call screen 600 of the terminal 110*b*. In response to a video call ongoing between the terminal 110*b* and the counterpart terminal 110*a*, navigation information according to location information of the terminal 110*b* may be displayed on the video call screen 600 of the terminal 110*b*. Here, a user interface for inputting a message 1110 may be displayed on the video call screen 600 of the terminal 110*b* and the video call screen 600 of the counterpart terminal 110*a*. For example, in response to the message 1110, "When will you get here?", input on the video call screen 600 of the counterpart terminal 110*a*, the message 1110 input from the counterpart terminal 110*a* may be displayed on the video call screen 600 of the terminal 110*b* and the video call screen 600 of the counterpart terminal 110*a*. The terminal 110*b* may input a response message to the message 1110 input from the counterpart terminal 110*a* through the video call screen 600 of the terminal 110*b*. The response message input to the video call screen 600 of the terminal 110*b* may be displayed on the video call screen 600 of the terminal 110*b* and the video call screen 600 of the counterpart terminal 110*a*.

As described above, according to example embodiments, it is possible to receive navigation information and to transmit and receive a message, such as the message 1110, through video call screens of terminals.

Figure 12:
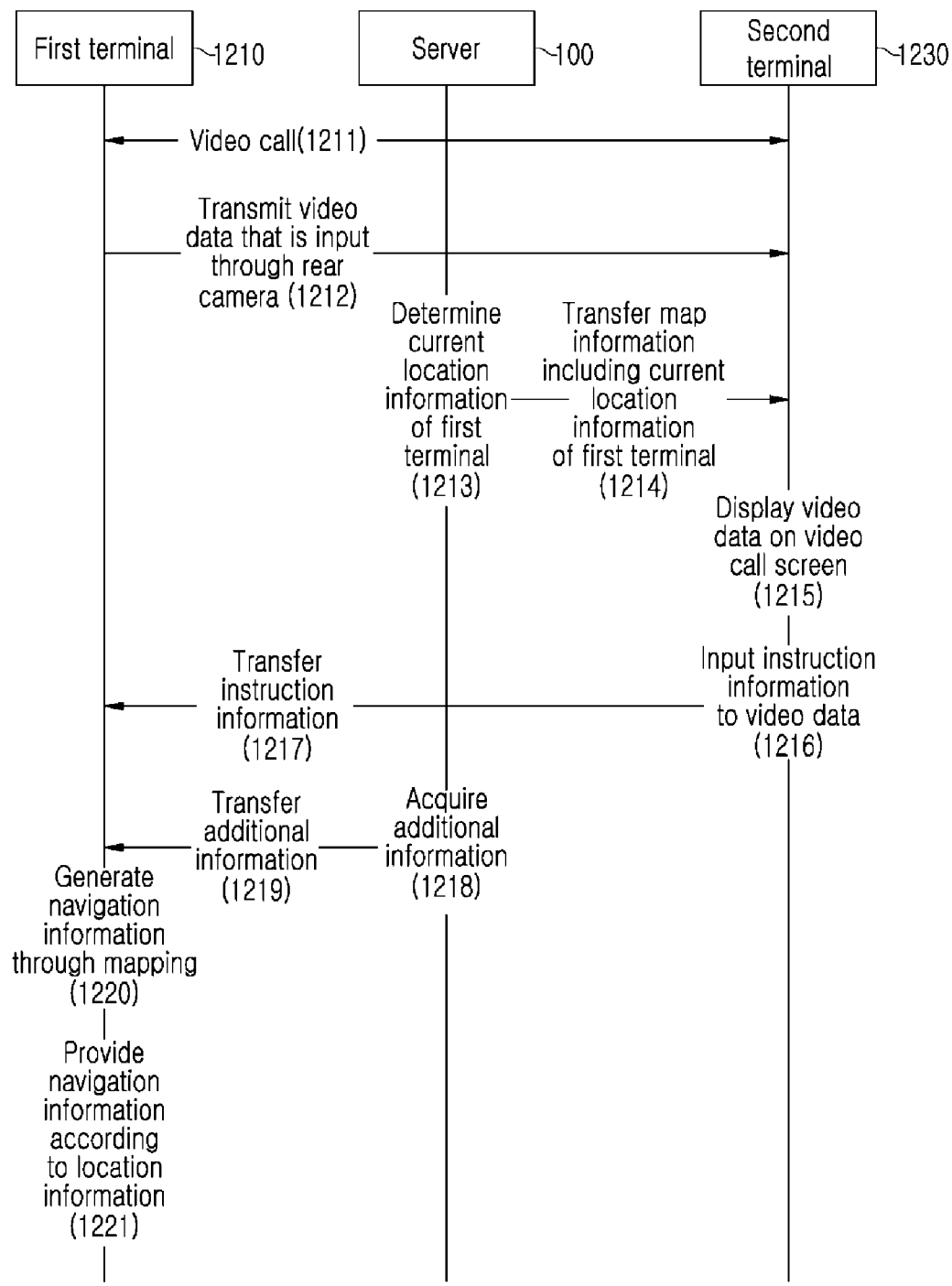
FIG. 12 is a flowchart illustrating an example of a method of providing navigation information according to at least one example embodiment.

FIG. 12 is a flowchart illustrating an example of a method of providing navigation information according to at least one example embodiment.

Hereinafter, a method of providing navigation information through operations of a first terminal 1210, a second terminal 1230, and a navigation server 100 will be described with reference to FIG. 12.

Referring to FIG. 12, the first terminal 1210 may request the second terminal 1230 for a video call. In response thereto, the second terminal 1230 may accept the video call requested by the first terminal 1210. Through this, a call for the video call may be established between the first terminal 1210 and the second terminal 1230 and the video call may be performed between the first terminal 1210 and the second terminal 1230.

During the video call between the first terminal 1210 and the second terminal 1230 in operation 1211, a video call screen of the first terminal 1210 may acquire video data input through a rear camera of the first terminal 1210. Here, a description is made based on a rear camera mode among one or more camera modes, for example, a front camera mode for executing a front camera of the first terminal 1210 and the rear camera mode for executing a rear camera of the first terminal 1210. However, it is provided as an example only. Any type of camera modes may be used if it allows input of the video data during the video call in the first terminal 1210. Here, the video data may be video data based on a current location of a terminal. In operation 1212, the first terminal 1210 may transmit, to the second terminal 1230, the video data that is input to the video call screen of the first terminal 1210. Here, although FIG. 12 is described that the first terminal 1210 requests the second terminal 1230 for a route, it is provided as an example only.

The second terminal 1230 may receive the video data that is input to the video call screen of the first terminal 1210. For example, in operation 1213, the server 100 may receive the video data that is input to the video call screen of the first terminal 1210 and may determine location information of the first terminal 1210. As another example, the server 100 may determine location information of the first terminal 1210 based on GPS information of the first terminal 1210. As another example, the server 100 may receive GPS information of the first terminal 1210 and video data that is input to the video call screen of the first terminal 1210 and may determine location information of the first terminal 1210. In operation 1214, the server 100 may transfer, to the second terminal 1230, map information that includes current location information of the first terminal 1210. In operation 1215, the video data and the map information transmitted from the first terminal 1210 may be displayed on a video call screen of the second terminal 1230.

In operation 1216, the second terminal 1230 may input instruction information for a navigation based on the video data. The second terminal 1230 may transfer the input instruction information to the first terminal 1210. The first terminal 1210 may receive the input instruction information from the second terminal 1230. In operation 1218, the server 100 may acquire additional information based on the instruction information received from the second terminal 1230. For example, the server 100 may acquire the additional information through a separate server based on the instruction information. Alternatively, the server 100 may generate the additional information by extracting information stored in a database based on the instruction information. In operation 1219, the server 100 may transfer the acquired additional information to the first terminal 1210.

In operation 1220, the first terminal 1210 may generate navigation information by mapping the instruction information received from the second terminal 1230 and the additional information received from the server 100 to the video data that is currently being displayed on the first terminal 1210. For example, the first terminal 1210 may overlappingly map a layer including the instruction information and a layer including the additional information to the video data based on a location at which the instruction information is input and the location information of the first terminal 1210. Here, AR-based navigation information may be generated.

In operation 1221, the first terminal 1210 may provide the navigation information based on the location information. For example, the first terminal 1210 may provide the navigation information according to the location information of the first terminal 1210 as a user of the first terminal 1210 moves.

The apparatuses and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially designed to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented navigation method comprising:

transmitting, from a terminal, current location-based video data during a video call, the video data comprising an image of the video call and metadata acquired from a camera;

receiving, from a counterpart terminal, instruction information for navigation based on the video data, the instruction information including route instructions between two points;

generating navigation information to display a route based on the route instructions between the two points by mapping the instruction information to the video data; and providing the navigation information based on location information of the terminal by overlaying a layer onto features of the image of the video call, the layer including the route.

2. The method of claim 1, wherein the providing of the navigation information comprises providing augmented reality (AR)-based navigation information generated by mapping the instruction information to the video data of the terminal, based on the location information of the terminal.

3. The method of claim 1, wherein the mapping of the instruction information to the video data is based on a location at which the instruction information is input.

4. The method of claim 1, wherein the receiving of the instruction information comprises receiving, from the counterpart terminal, instruction information that is input through a user interface for inputting the instruction information in response to the user interface being provided to the counterpart terminal.

5. The method of claim 1, wherein the receiving of the instruction information comprises receiving, from the counterpart terminal, instruction information associated with a specific event input to the video data.

6. The method of claim 1, wherein the providing of the navigation information comprises providing guidance information associated with the navigation information based on the location information of the terminal.

7. The method of claim 1, wherein the providing of the navigation information comprises consecutively updating the navigation information based on changed location information of the terminal in response to the location information of the terminal being changed.

8. The method of claim 1, wherein the providing of the navigation information comprises playing content including a destination route of the terminal as the navigation information in response to the content being uploaded from the counterpart terminal.

9. The method of claim 1, wherein the providing of the navigation information comprises generating information associated with a deviation of the terminal in response to detecting an occurrence of the deviation of the terminal based on the navigation information.

10. The method of claim 1, wherein the providing of the navigation information comprises transmitting and receiving a message between the terminal and the counterpart terminal.

11. The method of claim 1, wherein the providing of the navigation information comprises displaying a travel route through which the terminal is moving based on the location information of the terminal.

12. The method of claim 1, wherein the transmitting of the current location-based video data comprises transmitting, to the counterpart terminal, the current location-based video data that is input to the video call screen of the terminal, according to a camera mode that operates during the video call.

13. A non-transitory computer-readable recording medium storing instructions that, when executed by a processor, cause the processor to perform a navigation method comprising:

transmitting, from a terminal, current location-based video data during a video call, the video data comprising an image of the video call and metadata acquired from a camera;

receiving instruction information, from a counterpart terminal, for navigation based on the video data, the instruction information including route instructions between two points;

generating navigation information to display a route based on the route instructions between the two points by mapping the instruction information to the video data; and providing the navigation information based on location information of the terminal by overlaying a layer onto features of the image of the video call, the layer including the route.

14. A navigation server comprising:

a memory configured to store instructions; and a processor, configured to execute the instructions to determine current location information of a terminal during a video call from video data comprising an image of the video call and metadata acquired from a camera;

acquire additional information associated with instruction information for navigation that is input based on video data of the terminal from a counterpart terminal in response to the video data of the terminal being displayed on a video call screen of the counterpart terminal, the instruction information including route instructions between two points; and provide the additional information associated with the instruction information to the terminal to be mapped to the image of the video call as a layer including the additional information as a route, based on the route instructions, between the two points.

15. The navigation server of claim 14, wherein the processor is configured to generate augmented reality (AR)-based navigation information by mapping the additional information associated with the instruction information to the video data.

16. The navigation server of claim 14, wherein the processor is configured to transfer map information including the current location information of the terminal to the video call screen of the counterpart terminal.

17. The navigation server of claim 14, wherein the processor is configured to generate guidance information based on the current location information of the terminal and the instruction information.

18. The navigation server of claim 14, wherein the processor is configured to set a deviation range for detecting a deviation of the terminal, to determine whether the terminal is deviated based on the deviation range, and to generate an alert message.

19. The navigation server of claim 14, wherein the processor is configured to generate the layer that includes additional information associated with the instruction information and to transmit the layer to the terminal.

20. The navigation server of claim 16, wherein the processor is configured to display, on the video call screen of the counterpart terminal, a travel route according to location information of the terminal based on navigation information that is displayed on the video call screen of the terminal.

\* \* \* \* \*